Sept. 18, 1962   O. S. NORDLAND   3,054,650
AUTOPSY TABLE
Filed March 30, 1960   5 Sheets-Sheet 4

United States Patent Office 3,054,650
Patented Sept. 18, 1962

3,054,650
AUTOPSY TABLE
Oskar Spangberg Nordland, deceased, late of Kingston, Ontario, Canada, by Rhoda B. Nordland, executrix, Kingston, Ontario, Canada, assignor to Her Majesty the Queen in right of Canada, as represented by the Minister of National Defence
Filed Mar. 30, 1960, Ser. No. 18,620
Claims priority, application Canada Jan. 21, 1960
8 Claims. (Cl. 312—209)

This invention relates to an autopsy table having a collapsible working platform and a built in disposal tank for the safe and convenient disposal of autopsied infected animals.

Heretofore it has been necessary to manually remove autopsied animals from the autopsy table to a disposal container, following which another autopsy could be conducted or the autopsy table could be disinfected. It has not been possible to conduct a succession of autopsies without the autopsied animal being removed to a disposal tank following each autopsy. Furthermore when dealing with experimental animals infected with a highly dangerous agent there is danger that the operator will become infected when he moves the autopsied animals from the autopsy table to the disposal tank.

It has been found that these disadvantages may be overcome by combining the autopsy table and the disposal tank in one unit which obviates manual removal of autopsied animals and permits autoclaving the unit for steam sterilization. Autopsied animals need not, therefore, be handled until after they have been sterilized and steam sterilization assures that subsequent autopsies will be performed on a sterile autopsy table.

According to the invention an autopsy table comprises a disposal tank having a top aperture with a platform forming a closure over the aperture and means are included for moving the platform to open and close the disposal tank.

In drawings which illustrate an embodiment of the invention:

Figure 1:
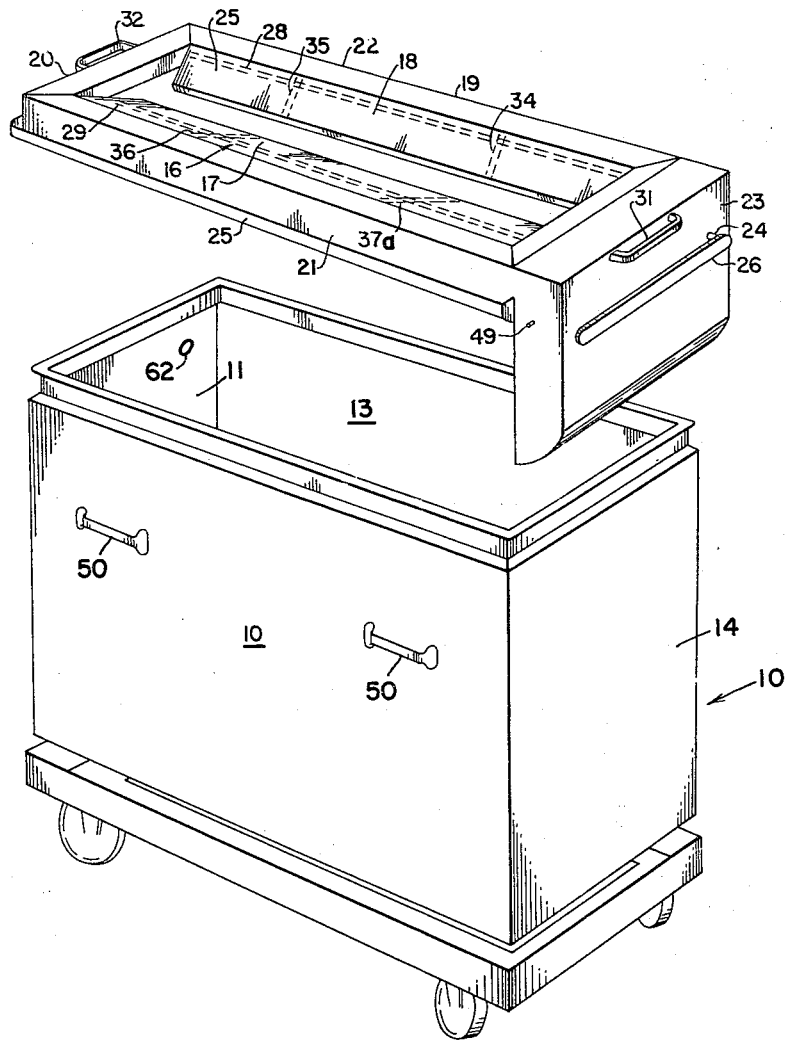
FIGURE 1 is an exploded perspective view of this embodiment.
Figure 2:
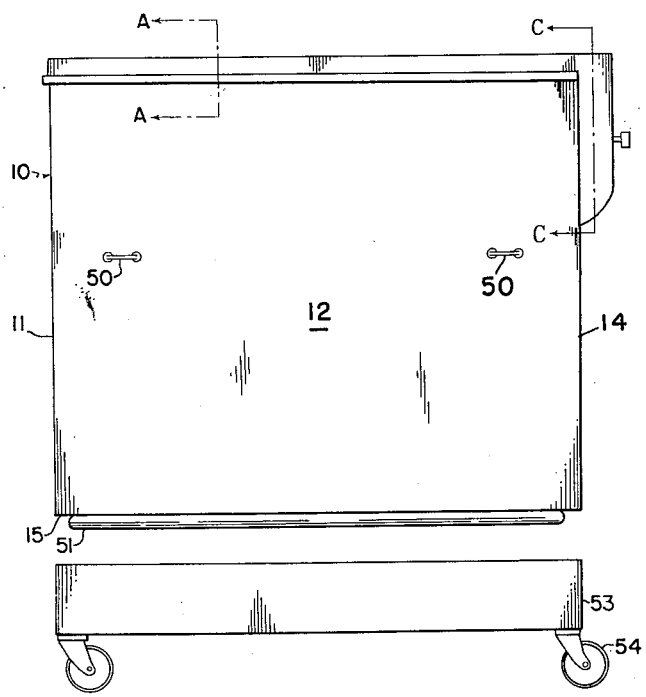
FIGURE 2 is a front elevation view.
Figure 3:
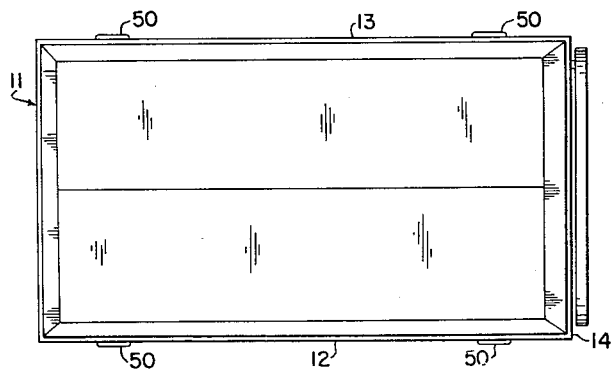
FIGURE 3 is a plan view.
Figure 8:
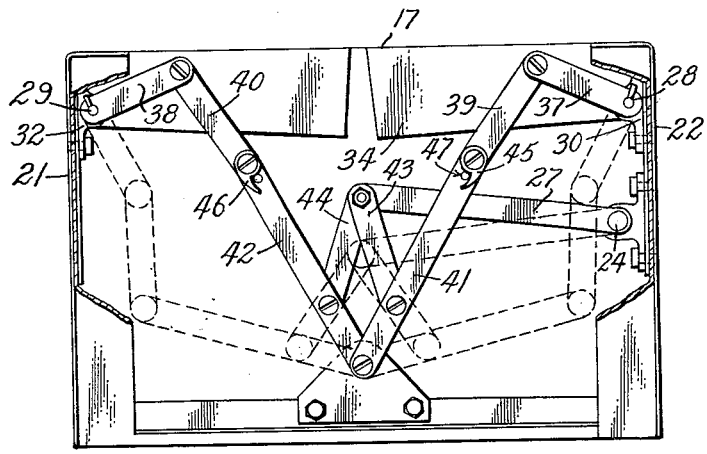
FIGURE 8 is a section of the line C—C of FIGURE 2.
Figure 10:
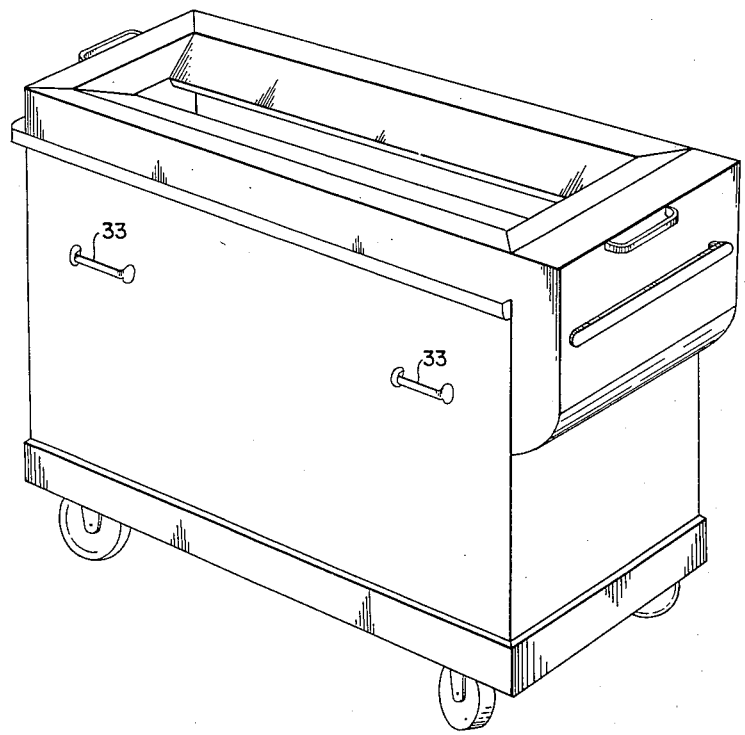

The embodiment illustrated in FIGURE 2 comprises a disposal tank 10 of rectangular shape with front wall 11, side walls 12 and 13, rear wall 14 and bottom 15. The tops of the walls 11, 12, 13 and 14 are bent inwards and upwards to receive platform 16 formed of two parts 17 and 18. (See FIGURE 1). An L-shaped frame 19 surrounds the platform 16 and comprises a front wall 20, side walls 21 and 22 and rear wall 23. The bottoms of walls 20 and 21 and 22 are bent outwards and upwards to form a gutter 25. Shaft 24 extends through rear wall 23 of L-shaped frame 19. Handle 26 is fixedly attached to the outer end of shaft 24 and connecting arm 27 (see FIGURE 8) is fixedly attached to the inner end of shaft 24.

Bars 28 and 29 (see FIGURE 8) are supported for axial rotation by bearing 30 which is affixed to wall 22 of L-shaped frame 18 and by bearing 32 which is affixed to wall 21 of L-shaped frame 19. Bars 28 and 29 are fixedly attached to platform parts 18 and 17 respectively at the side walls of stiffening channels 34, 35, 36 and 37 (see FIGURE 1). Bars 28 and 29 each have one connecting arm 37 and 38 respectively attached thereto (see FIGURE 8). The connecting arms 37 and 38 are rotatably attached at their other ends to a second pair of connecting arms 39 and 40 respectively which are rotatably attached to a third pair of connecting arms 41 and 42 respectively which at their other ends are rotatably attached to a fixed point. Connecting arms 41 and 42 are rotatably attached along their lengths to connecting arms 43 and 44 respectively which latter connecting arms are rotatably attached at their other ends to connecting arm 27.

With platform parts 17 and 18 in closed position hook extensions 45 and 46 of connecting arms 39 and 40 respectively in conjunction with pins 47 and 48 which are fixedly attached to connecting arms 41 and 42 respectively operate as a self locking device which can be released by pressure on handle 26 but not by pressure on platform parts 17 or 18.

If desired a hole or exhaust vent 62 can be cut in any of the walls 11, 12, 13 or 14 of disposal tank 10 but preferably in wall 11 thereof to remove aerosolized toxic material by a negative air pressure.

L-shaped frame 19 is fixed in position by a suitable locking arrangement (not shown) which is released when pressure is exerted against pin 49 (see FIGURE 1) permitting frame 19 and platform parts 17 and 18 to be removed as a unit from the disposal tank 10. For convenience of handling, disposal tank 10 has handles 50 suitably positioned.

Figure 5A:
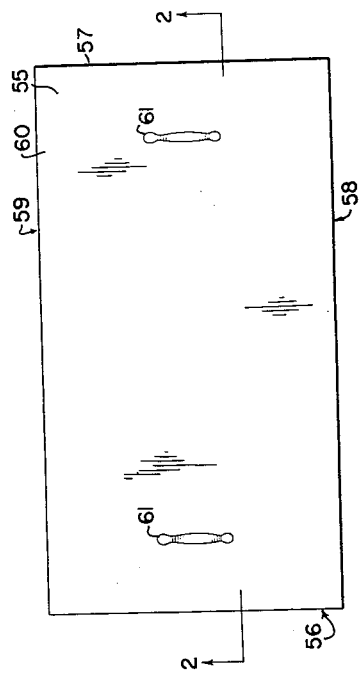
FIGURES 5A and 5B are respectively plan and front elevation views of an autopsy table cover for this embodiment.
Figure 5B:
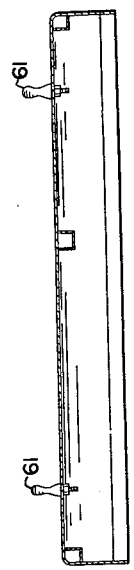
Figure 4:
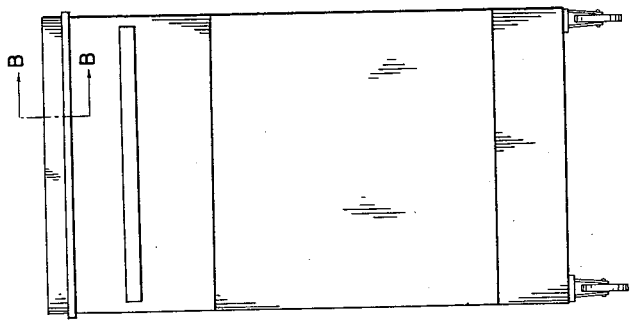
FIGURE 4 is an end elevation view as viewed from the right.
Figure 6:
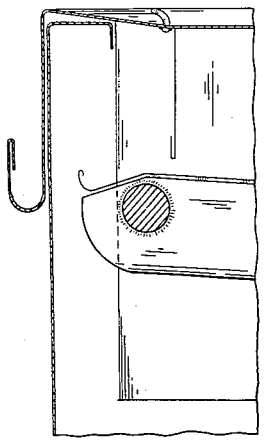
FIGURE 6 is a section of the line A—A of FIGURE 2.
Figure 7:
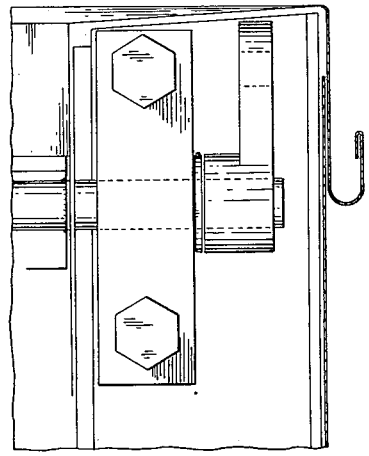
FIGURE 7 is a section of the line B—B of FIGURE 4.
Figure 9:
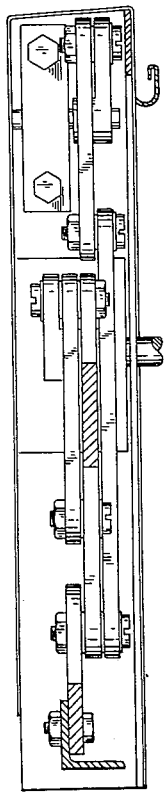
FIGURE 9 is a section of the line D—D of FIGURE 4.

Attached to the bottom of the disposal tank 10 is a framework 51 (see FIGURE 2) adapted to fit snugly inside carriage 52 which comprises a framework 53 mounted on casters 54. A cover (see FIGURES 5A and 5B) 55 for the autopsy table consists of ends 56 and 57, sides 58 and 59 and top 60 with suitably positioned handles 61. The inner dimensions of the cover 55 are slightly larger than the outer dimensions of the L-shaped frame 19.

During an autopsy, platform parts 17 and 18 are in horizontal or closed position supporting the animal being autopsied. When the operator has completed his examination, a movement of handle 26 will cause relative motion of all the connecting arms to rotate bars 28 and 29. With the rotation of bars 28 and 29 the platform parts 17 and 18 swing downward in an arc and the animal drops into the disposal tank. Platform parts 17 and 18 can then be closed and another autopsy conducted or the autopsy table and disposal tank can be autoclaved and steam sterilized. After being steam sterilized, the autopsied animal can be disposed of without danger of infection to the handler. If desired a cushioning material can be placed in the disposal tank to cushion the fall of an autopsied animal to prevent or reduce splashing and to keep the animal separated from the sides and bottom of the disposal tank. A disposable sleeve can be used on handle 26 and dropped into the disposal tank at the completion of the last autopsy.

What is claimed is:
1. An autopsy table including a disposal tank having a wall structure comprising side walls, end walls and a bottom, a platform forming a top closure for said wall structure, said platform being formed of two parts, each of said platform parts being attached to a rotatable bar, said platform parts being pivotable between a first closed position forming a substantially flat platform adapted to support a carcass thereon to be autopsied and a second open position wherein said parts are located within said disposal tank for depositing said carcass within said dis- posal tank, and manually operative means disposed externally of said disposal tank and adapted to impart rotation to said bars to pivot said platform parts between said first and second operative positions.

2. An autopsy table including a disposal tank having a wall structure comprising side walls, end walls and a bottom, a platform forming a top closure for said wall structure, said platform being formed of two parts, each of said parts being attached to a bar mounted for rotation to the walls of a frame outlining the platform, manually operative means disposed externally of said disposal tank and adapted to impart rotation to said bars to pivot said platform parts between a first closed operative position in which said platform parts form a substantially flat platform adapted to support a carcass thereon to be autopsied, and a second open operative position in which said platform parts are located within said disposal tank for depositing said carcass within said disposal tank and means for locking the platform parts in closed operative position.

3. An autopsy table according to claim 2 in which the frame is detachable from the disposal tank.

4. An autopsy table according to claim 2 in which the manually operative means for rotating the bars comprises a lever linkage connecting the bars to a handle whereby a motion of said handle causes rotation of the bars.

5. An autopsy table according to claim 4 in which the two platform parts, the bars, the lever linkage and the handle comprise a unit adapted to fit over the tank and form a closure thereon with a locking mechanism which is releasable by exerting pressure against a pin which projects from the unit.

6. An autopsy table according to claim 4 in which the disposal tank contains means whereby aerosolized toxic material can be withdrawn from the disposal tank.

7. An autopsy table according to claim 4 which rests on a wheeled framework.

8. An autopsy table including a disposal tank having a wall structure comprising side walls, end walls and a bottom, a platform forming a top closure for said wall structure, said platform being formed of two parts, each of said parts being attached to a bar mounted for rotation to the walls of a frame outlining the platform, each of said bars being secured to one end of one of a first pair of connecting arms, the opposite ends of each of said first pair of connecting arms being rotatably attached to one of a second pair of connecting arms, each of said second pair of connecting arms being rotatably attached to one of a third pair of connecting arms, each of said third pair of connecting arms being rotatably attached together and to a fixed point on said frame, each of said third pair of connecting arms being rotatably attached along their lengths to one of a fourth pair of connecting arms, each of said fourth pair of connecting arms being rotatably attached together and to a final connecting arm which is attached to a handle so that a movement of the handle causes relative motion of the connecting arms to rotate the bars.

References Cited in the file of this patent

UNITED STATES PATENTS

| | | |
|---|---|---|
| 1,371,229 | De Forest | Mar. 15, 1921 |
| 1,481,922 | Miller | Jan. 29, 1924 |
| 1,582,805 | Tracy | Apr. 27, 1926 |
| 1,652,465 | Weinstein | Dec. 13, 1927 |
| 2,060,065 | Gill | Nov. 10, 1936 |
| 2,256,111 | Cull | Sept. 16, 1941 |
| 2,888,307 | Graves | May 26, 1959 |